Feb. 5, 1924.        1,482,825
J. STEVENS, 3D
APPARATUS FOR TREATMENT OF WASTE PAPER
Filed Nov. 20, 1920
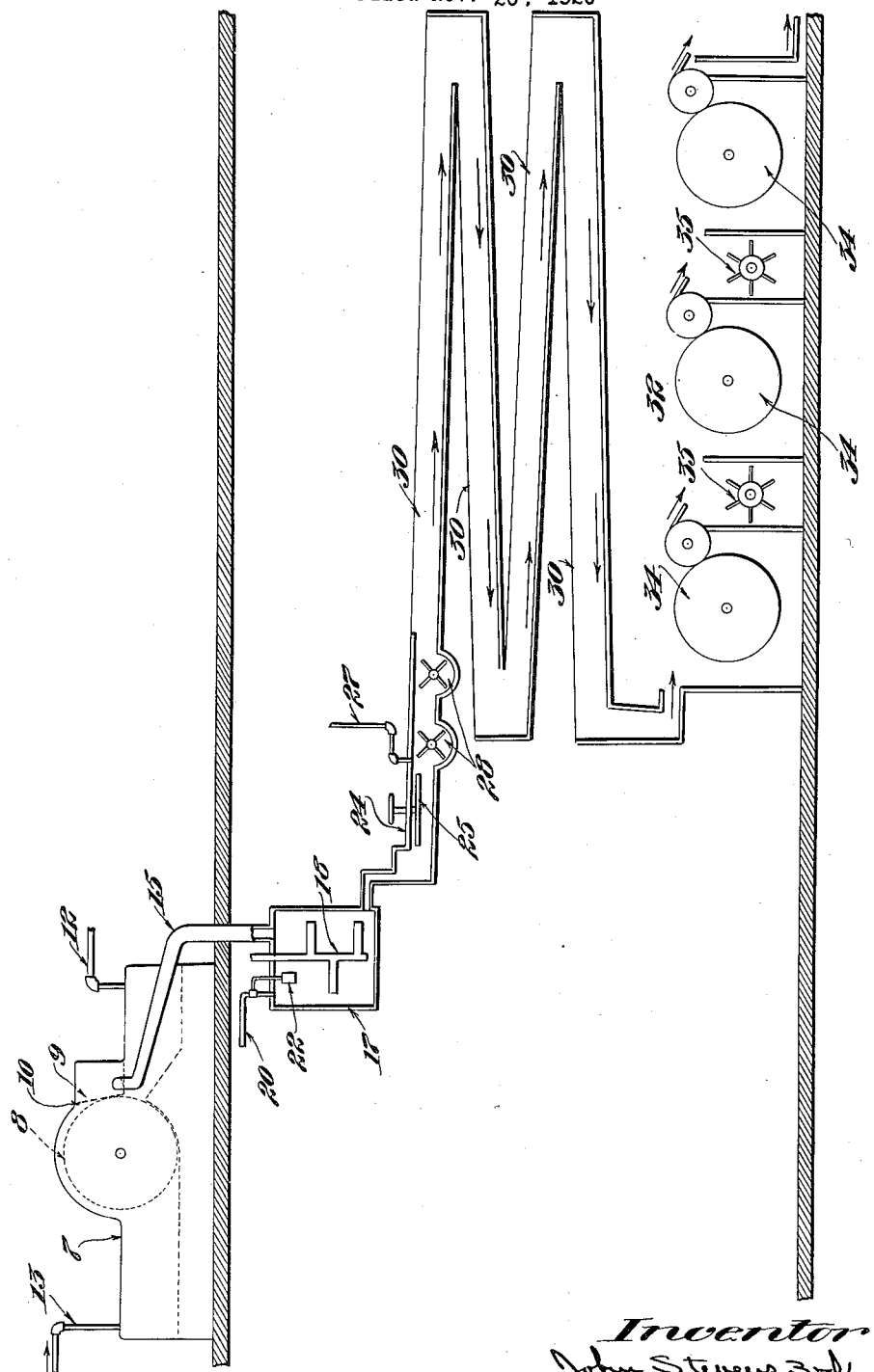

Patented Feb. 5, 1924.

1,482,825

UNITED STATES PATENT OFFICE.

JOHN STEVENS, 3D, OF BOSTON, MASSACHUSETTS, ASSIGNOR TO ARTHUR D. LITTLE, INC., OF CAMBRIDGE, MASSACHUSETTS, A CORPORATION OF MASSACHUSETTS.

APPARATUS FOR TREATMENT OF WASTE PAPER.

Application filed November 20, 1920. Serial No. 425,541.

*To all whom it may concern:*

Be it known that I, JOHN STEVENS, 3d, a citizen of the United States, residing at Boston, in the county of Suffolk and State of Massachusetts, have invented certain new and useful Improvements in Apparatus for Treatment of Waste Paper; and I do hereby declare the following to be a full, clear, and exact description of the invention, such as will enable others skilled in the art to which it appertains to make and use the same.

The present invention relates to a process and apparatus for the treatment of waste paper and more particularly to waste print paper from which ink, sizing and similar matter must be removed.

It is customary in recovering waste paper of this character to first produce a pulp of the desired consistency and thereafter treat the pulp with a suitable form of detergent to loosen the ink and other foreign matter which it is desired to remove, thereafter the detergent together with the loosened ink being washed out to thoroughly cleanse the fibers and convert the pulp into a condition suitable for further use. The several operations incident to this conversion of the waste print paper have been heretofore carried on separately and intermittently, the process as a whole consuming considerable time and involving substantial labor costs in addition to the space occupied by the necessary machines and storage chests for the pulp.

It is the object of the present invention to provide a new process and accompanying apparatus which overcomes the foregoing disadvantages incident to prior methods of deinking waste paper.

Accordingly one feature of the present invention contemplates a continuous advancing movement of a pulpy mass of waste paper between the pulping and washing points while subjecting the pulp to the several operations essential to the complete removal of the ink and other foreign material therefrom.

Still further features of the invention will be apparent to those skilled in the art from the following complete description of the process and apparatus for practicing it.

The accompanying drawing illustrates diagrammatically an apparatus embodying the novel features of the invention.

According to the present invention the waste print paper is first beaten or otherwise formed into a pulpy mass in the presence of hot water which may range in temperature from 120° to 180° F. depending upon the character of the waste paper under treatment, this operation being designed to produce a substantially continuous flow of paper pulp. After suitably regulating the consistency of the pulp it is mixed with a detergent such as soda ash solution and maintained in contact with the detergent for a sufficient period of time to effectually free the fiber from the ink, sizing and other foreign materials. This treatment with the detergent takes place during a continuous advancing movement of the pulp toward the washing point at which all of the foreign matter including the detergent is completely separated and removed from the fiber. In the illustrated embodiment of the invention the pulp, after impregnation with the soda ash solution, advances along a series of troughs or rifflers which are so designed that the movement of the pulp thereover occupies a sufficient period of time to permit the desired action of the detergent in emulsifying or otherwise effecting the separation of the ink, sizing, etc., from the waste paper. It is preferred to arrange the surface of the troughs over which the pulp flows at a slight inclination to cause the movement of the pulp thereover to be produced by gravity although this may also be accomplished through the provision of a riffler provided with a series of transverse partitions of diminishing height over which the pulp successively passes. The washing machine in which the pulp is freed from the ink provides for a continuous movement of the pulp therethrough until discharged into suitable storage chests. According to this process it will be observed that the movement of the pulp from the point of its formation to the final washing point is continuous, the several intermediate operations taking place during this movement.

Upon referring to the drawing it will be observed that the waste paper first passes through a beater of the usual form indicated at 7 and comprising a beating cylinder 8 designed to discharge the pulp through a series of holes or perforations 9 formed in a partition 10. From this point the pulp flows by gravity into a conveyer pipe 15 communicating with a mixing vat or tank 17. The beater 7 is provided with intake pipes 12 and 13 for hot water and steam respectively and during the beating operation the pulpy mass is heated to a temperature ranging from 120° to 180° F. depending upon the character of the waste print paper. The mixing vat is provided with an agitator indicated at 18 and serves to automatically regulate the temperature of the pulp. For this purpose the vat may be provided with a steam line indicated at 20, which is controlled by a suitable form of thermostat 22. From the mixing vat the hot pulp flows by gravity to a consistency regulator indicated at 24 which may be of the usual form consisting of a channel having an adjustable gate 25 therein to regulate the cross section of the discharge passage. The pulp thus regulated as to temperature and consistency is next mixed with soda ash solution entering through a pipe 27 and thoroughly mixed with the pulp by suitable agitators 28. After being thus impregnated with the alkaline detergent the hot pulp is discharged onto one or more inclined troughs 30 along which it flows by gravity to be finally discharged into a cylinder washing machine, indicated at 32, the washing machine as is usual in this class of apparatus comprising cylinders 34 and agitator beaters 35 arranged alternately. As will be observed from the drawing the inclined trough along which the pulp flows to convey it to the washing mechanism is preferably made in a zigzag form to cause the pulp to traverse back and forth while constantly descending. With this arrangement the mechanism for initially forming the pulp may be located upon an upper floor and the washing mechanism upon a lower floor, the intermediate operations taking place during the movement by gravity of the pulp from the beating mechanism to the washing mechanisms. Furthermore owing to the configuration of the troughs in the form of a zigzag these may be supported adjacent the wall of the building in such a manner as to occupy a relatively small space.

I claim—

1. An apparatus for the treatment of waste printed paper comprising means for forming a hot pulp solution, means for thereafter mixing the solution with an alkaline detergent, a trough into which the pulp discharges after treatment with the detergent and of sufficient length to cause the detergent to remain in contact with the pulp during a substantial period of time, and means for receiving and washing the pulp after its discharge from the trough to remove ink and dirt therefrom.

2. An apparatus for the treatment of waste paper which comprises mechanism for beating the paper to form a pulp, means for heating the pulp thus formed, means for regulating the consistency of the pulp, means for mixing a detergent with the pulp, a series of connected troughs into which the pulp discharges after treatment with the detergent, and washing mechanism to receive the pulp discharged from the troughs and remove the ink and dirt with which the pulp is impregnated.

3. An apparatus for the treatment of waste printed paper comprising pulping mechanism, means for impregnating the pulp thus formed with an alkaline detergent, washing mechanism for removing the detergent and ink from the pulp, and connections between the mixing and washing mechanisms for causing a continuous and relatively slow movement of the pulp therebetween.

4. An apparatus for the treatment of waste printed paper comprising means forming a pulp and mixing the pulp thus formed with an alkaline detergent, washing mechanism to free the pulp from the ink and other foreign matter located below the pulping mechanism, and a zigzag trough connecting the pulping and mixing mechanism with the washing mechanism and adapted to cause a continuous movement of the pulp therebetween.

JOHN STEVENS, 3d.